United States Patent

[11] 3,568,116

[72] Inventor Jean Sole
Clamart, France
[21] Appl. No. 665,772
[22] Filed Sept. 6, 1967
[45] Patented Mar. 2, 1971
[73] Assignee Commissariat A L'Energie Atomique
Paris, France
[32] Priority Sept. 7, 1966
[33] France
[31] PV75599

[54] PROCESS AND APPARATUS FOR TRANSFERRING ENERGY TO AN ELECTRICALLY CONDUCTIVE MEDIUM
32 Claims, 4 Drawing Figs.

[52] U.S. Cl. .......... 335/216, 331/94.5
[51] Int. Cl. .......... H01f 1/08, H01f 7/22, H01s 3/09
[50] Field of Search .......... 335/216; 317/123; 307/245, 277, 306, 307; 315/111 (Cursory); 330/4.3; 310/10, 40

[56] References Cited

UNITED STATES PATENTS

| | | | |
|---|---|---|---|
| 3,394,330 | 7/1968 | Schindler | 335/216 |
| 3,270,247 | 8/1966 | Rosner | 335/216(UX) |
| 3,209,281 | 9/1965 | Colgate et al. | 330/4.3 |
| 3,198,994 | 8/1965 | Hildebrandt et al. | 335/216 |
| 3,187,235 | 6/1965 | Berlincourt et al. | 335/216 |
| 3,292,021 | 12/1966 | Hoag | 310/10 |

OTHER REFERENCES

Journal of Applied Physics, Vol 34, No 4 (Part 2), April 1963 Pages 1376–1377 (Z. J. J. Stekly et al.)

*Primary Examiner*—Bernard A. Gilheany
*Assistant Examiner*—Dewitt M. Morgan
*Attorney*—Craig, Antonelli, Stewart & Hill

ABSTRACT: A process and apparatus for transferring energy to an electrically conductive medium. The conductive medium is disposed in an inner chamber which is surrounded by an annular chamber having walls internally covered with a layer adapted to have superconductive properties. According to the present disclosure the layer is brought to a state of superconductivity producing a current density in the superconducting layer, said trapped current across the superconducting layers producing a magnetic field in the annular chamber which corresponds to a given energy and transferring this energy into the electrically conductive medium in the inner chamber by causing the transition of said layers from the superconductive state to the normal state.

INVENTOR

JEAN SOLE

BY Craig & Antonelli

ATTORNEYS

INVENTOR

JEAN SOLE

BY Craig & Antonelli

ATTORNEYS

Figure 1:
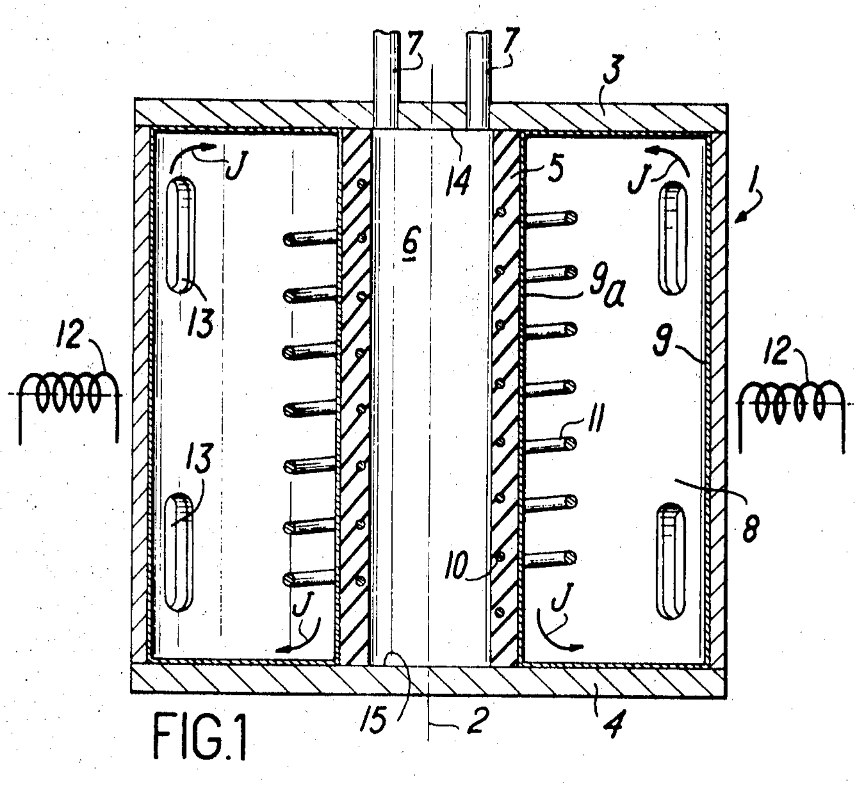

PROCESS AND APPARATUS FOR TRANSFERRING ENERGY TO AN ELECTRICALLY CONDUCTIVE MEDIUM

BACKGROUND OF THE INVENTION

The present invention relates to a method an apparatus for the introduction of energy into a conductive, preferably gaseous medium, and in particular into a plasma, i.e., a medium formed by an ionized gas.

A known method for introducing energy into a plasma is to use the discharge produced by a battery of capacitors which are connected by means of appropriate connections to the apparatus or chamber in which the plasma is produced or confined. However, this method has various disadvantages. For example, the use of capacitors does not permit the storage of high energies, exceeding several megajoules, and the connections to the capacitors introduce relatively high undesired impedances. Moreover, the inductance interferences of the connections are by no means negligible and may cause the oscillation of the electric discharge. In this case, the current in the plasma is reversed at each half-period of the oscillations and disturbs the plasma itself. Also, the resistance of the connections may be high in comparison with the apparent resistance of the plasma, which greatly reduces the efficiency of energy transfer to the plasma. Furthermore, in a damped system, the voltage at the terminals of the plasma is limited and may not exceed the capacitor charge voltage.

SUMMARY OF THE INVENTION

An object of the present invention is to avoid the prior art disadvantages in electromagnetic devices.

Another object of the present invention is to obviate the above-mentioned disadvantages by a new method and apparatus for transferring energy to an electrically conductive medium.

A further object of the present invention is to provide a process and apparatus for transferring energy to an electrically conductive medium wherein direct connection between the energy storage circuit and the load circuit is avoided.

A still further object of the present invention is to provide a process and apparatus wherein far higher energies can be transferred than with conventional methods and nonoscillating electric discharges can be obtained.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the above-mentioned disadvantages may be eliminated and a much improved process and apparatus for transferring energy to an electrically conductive medium may be obtained by storing energy in the form of a current passing through a superconductive circuit closed on itself and characterized by the fat that at least part of the covering of a wall of the chamber containing the electrically conductive medium is made of a superconductive material, said part being disposed along an interruption of the superconductive storage circuit, and caused to undergo transition from the superconductive state to the normal state.

The present invention also relates to an apparatus for the implementation of the above-mentioned method, characterized in that it comprises a chamber which contains the conductive medium wherein at least part of the wall covering of said chamber is made of superconductive material, a superconductive circuit closed on itself by means of the covering part, means for producing a current in the closed superconductive circuit, and means for causing the covering part to undergo transition from the superconductive state to the normal state.

The present invention will become fully understood from the detailed description hereinbelow and the accompanying drawings which are given by way of illustration only and thus are not limitative of the present invention and wherein, FIG. 1 is a section of an apparatus for introducing energy into a plasma according to the method the present invention.

Figure 2:
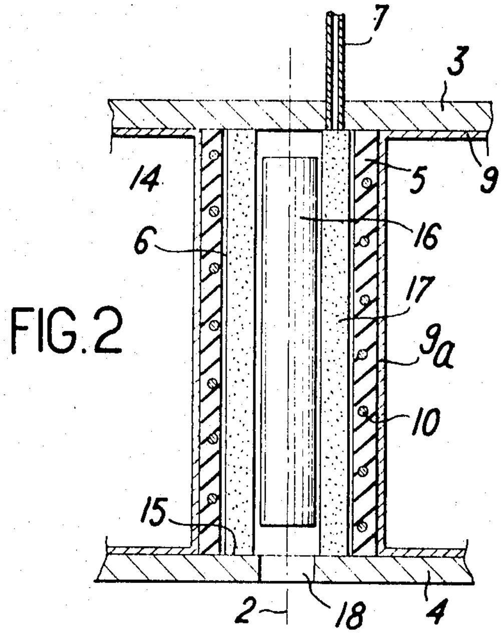
Figure 3:
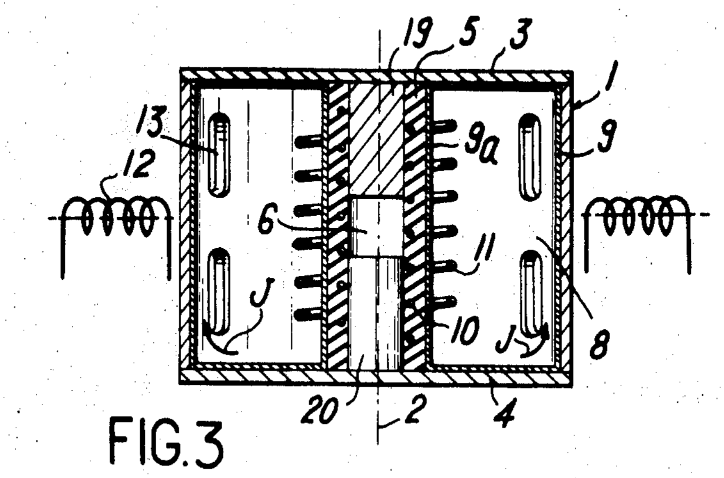
Figure 4:
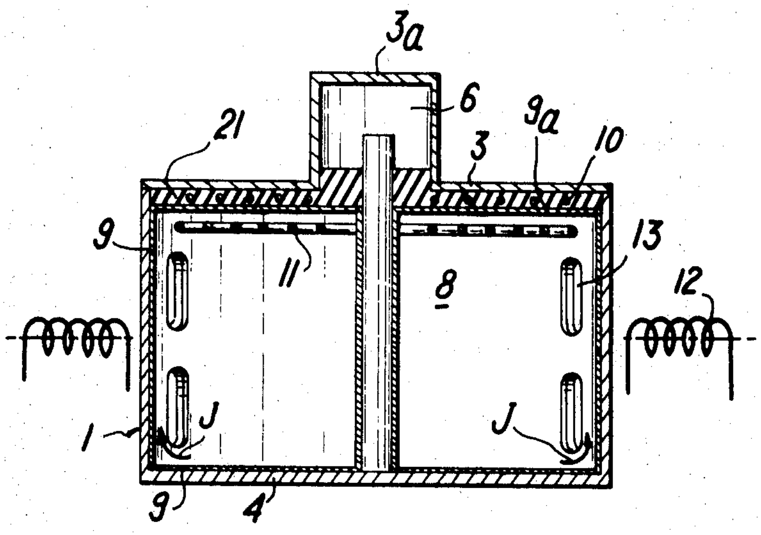

FIGS. 2, 3 and 4 illustrate three alternative embodiments of the apparatus of FIG. 1.

As shown in FIG. 1, the apparatus of the present invention comprises a cylinder 1 having an axis 2, and made of a material which is a good conductor of electricity, for example copper. The ends of the cylinder are closed by two plates 3, 4 also made of a good conductor of electricity, for example copper. A second cylinder 5, which is coaxial with the first cylinder 1 and made of an insulating material, is disposed inside the resulting closed box. This second hollow cylinder 5 bounds an internal chamber 6 about the axis 2 and has insulating sidewalls. In the inside of chamber 6 there is confined a gas or plasma or mass of ionized gas to which it is desired to transfer the electrical energy. This gas is introduced through ducts 7 passing through the top plate 3. The cylinder 1, the plates 3 and 4, and the second cylinder 5 define an annular chamber 8 covered internally by a layer 9, **9*a* of a material adapted to have superconductive properties under appropriate temperature and magnetic-field conditions. The part 9*a* covers the insulating cylinder 5. The layer 9, 9*a* is advantageously made of a binary alloy of niobium and tin having the formula NB3Sn. The insulating cylinder 5 has in its mass a resistant circuit 10 for raising its temperature, this circuit consisting of a spiral winding of a resistant conducting wire. A solenoid 11 for producing a magnetic field on the superconductive layer 9*a* is disposed in the annular chamber 8 outside the cylinder 5. The resistant circuit 10 and the solenoid 11 are connected outside the apparatus to conventional electric-current sources (not shown). Electric coils 12 are provided around the outside of the cylinder 1**, in order to produce a sliding field by the supply of these coils with time-shifted multiphase alternating currents.

The apparatus described above operates as follows. The apparatus as a whole is brought to a very low temperature, for instance by immersion in a bath of liquid helium, which enters the annular chamber 8 by means of apertures 13 provided in the cylinder 1, and the layers 9 and **9*a* are brought into a state of superconductivity. After this operation has been carried out, a current density indicated diagrammatically by the arrows J, is produced in the layer by means of the sliding field produced by coils 12 preferably by using the features described and shown in U.S. Patent application entitled An Electromagnetic Accumulator Device and Method For Accumulating Electrical Energy, Ser. No. 654,104 filed Jul. 18, 1967. The current trapped across the superconductive layers 9 and 9*a* then produces in the annular chamber 8 a magnetic field of revolution about the axis 2, this field corresponding to a given energy. It is desired to transfer this energy into the plasma contained in chamber 6** in accordance with the method and apparatus of the present invention.

For this purpose, the transition of the layer **9*a* from the superconductive state to the normal state is caused. To achieve this object, the temperature of the layer 9*a* surrounding the cylinder 5 is raised by means of the circuit 10 to approximately the temperature adapted under the conditions of the experiment to cause the transition of the material forming the layer from the superconductive to the normal state. A magnetic pulse created by an appropriate current pulse is then produced in the solenoid 11, causing the immediate and total transition of the superconductive layer 9*a***.

When the transition of the layer has been effected, a potential difference is created between the faces 14 and 15 of the two plates 3 and 4 in the chamber 6. If the resistance of the layer **9*a*** in the normal state is high enough, this potential difference produces an electric arc, if the gas has not previously been ionized, and in any case causes the passage of the trapped current J into the plasma, releasing therein the energy initially stored in the annular chamber 8. There is produced in the plasma the conventional phenomenon known as "pinch," i.e. radial contraction of the plasma column as a result of the Laplace electromagnetic compression force due to the passage of the electric current through the plasma. Various features may, of course, be used in connection with the foregoing features to improve the energy-transfer conditions. Thus, a second enclosure (not shown) may be disposed in the chamber 6 containing the plasma, this second enclosure being formed by a material that does not conduct electricity, and being separated from the sidewalls of the cylinder 5 by a vacuum gap, to prevent the interior of the chamber 6 from being cooled by the sidewalls of the cylinder 5.

On the other hand, it may be desired to keep the sidewalls of the chamber 6 at a very low temperature. In this case, a gas, such as deuterium, may be injected through the apertures 7 and solidified by condensation on the inner wall of the cylinder 5, so as to produce on the latter a coaxial cylinder of solid deuterium. The thickness of the cylinder of deuterium depends on the volume of gas introduced into the chamber. By causing partial vaporization of the deuterium by means of a thermal pulse in the circuit 10, the potential difference occurring between the faces 14 and 15 of the plates 3 and 4 on the transition of the superconductive layer 9*a* to the normal state produces a plasma cylinder, into which energy previously stored in the superconductive layer of the chamber 8 is transferred according to the method described above.

Many modifications of the structure of the apparatus may also be used. For example, the cylindrical chamber 6 provided in the center of the apparatus may be filled with a tubular casing 17 (see FIG. 2) surrounding a laser rod 16. For the emission of the laser beam, at least one of the plates 3 or 4 of the apparatus has an aperture 18 whose diameter is the same as that of the beam. The annular chamber 17 surrounding the rod 16 is filled with a gas of the kind used at the present time in discharge tubes. At the two ends of the chamber 17, the gas is in direct contact with faces 14 and 15 of plates 3 and 4 respectively. When the transition of the superconductive layer 9*a* is affected, discharge takes place in the gas in the envelope 17, causing the pumping of the laser rod. The gas in the casing 17 may be preionized before or on discharge.

In the embodiment shown in FIG. 3, the plates 3 and 4 closing the cylinder 1 have extensions in the form of cylindrical electrodes 19 and 20, which enter the axis of the cylinder 5 and reduce the volume of the chamber 6. This reduction makes it possible, for a given chamber 6, to increase the length of the layer 9*a* acting as a superconductive or interruptor switch and thereby to increase the longitudinal dimension along the axis 2 of the energy-stored circuit. This embodiment includes the circuit 10 and solenoid 11 for the transition of the superconductive layer 9 releasing into the plasma the energy previously stored in that layer.

In FIG. 4, the chamber 6 containing the plasma is no longer in the center of the storage circuit 8, but, as shown in the drawing, is directly above the plate 3. The insulating cylinder 5 is replaced by a plate 21 adjacent to the plate 3, while the heating circuit 10 and the solenoid 11 are modified to effect, as before, the transition of the superconductive layer 9*a* and the transfer of the energy stored in the superconductive circuit 9, 9*a* to the plasma in the chamber 6.

This known formation of the chamber 6 produces a ball of plasma in the axis of the chamber on discharge and as a result of the Laplace compression forces.

Omitting the conductive top wall 3*a* of the chamber 6 give the plasma chamber a different shape, well-known as the plasma gun, whereby, by means of the Laplace force exerted on the plasma during discharge, bursts of plasma can be propelled in the direction of the axis of the chamber. The superconductive layers 9 and 9*a* forming the storage circuit may, of course, be replaced by a set of turns made of wire or strips, and closed and juxtaposed. These turns may also be disposed in series with each other and form a continuous winding. In the latter case the energy may be stored by connecting to a conventional continuous-current source two points of the wire or strip, which is then joined by a superconductive connection according to a known principle.

As can be readily seen from the foregoing discussion, whichever embodiment is used to implement the method of the present invention, the use is avoided of direct connections between the energy-storage circuit and the load circuit, i.e. the plasma or casing containing it. As a result, far higher energies can be transferred than with conventional methods, and nonoscillating electric discharges can be obtained.

I claim:

1. A method for transferring energy to an electrically conductive medium in an inner chamber which is surrounded by an annular chamber having walls at least partially, internally covered with a layer adapted to have superconductive properties which comprises bringing said layer to a state of superconductivity, producing a current density in the superconducting layer, trapping the current in the annular chamber said trapped current across the superconductive layer producing a magnetic field in the annular chamber which corresponds to a given electrical energy, and transferring this electrical energy into the electrically conductive medium in the inner chamber by causing the transition of said layer from the superconductive state into the normal state.

2. The method of claim 1 wherein a state of superconductivity is produced in the layer by bringing it to a very low temperature.

3. The method of claim 1 wherein the current density is produced in the superconducting layer by means of a drifting field produced by coils provided with time-shifted, multiphase alternating currents.

4. The method of claim 1 wherein the energy is transferred into the electrically conductive medium in the inner chamber by raising the temperature of the layer thereby causing the transition of the said layer from the superconductive state to the normal state.

5. The method of claim 4 wherein, in addition to raising the temperature of said layer a magnetic pulse created by a current pulse causes immediate and total transition of the layer from the superconditive state to the normal state.

6. A method for transferring energy to an electrically conductive medium in an inner chamber which is surrounded by an annular chamber having walls at least partially internally covered with a layer adapted to have superconductive properties which comprises producing a state of superconductivity in the layer by bringing it to a very low temperature, producing a current density in the superconducting layer by means of a drifting field produced by coils provided with a time-shifted, multiphased alternating current, trapping the current in the annular chamber, said trapped current across the superconductive layer producing a magnetic field of revolution in the annular chamber which corresponds to a given energy, transferring this energy into the electrically conductive medium in the inner chamber by raising the temperature of the layer thereby causing the transition of said layer from the superconductive to the normal state which creates a potential difference which in turn produces an electric arc causing passage of the trapped current into the electrically conductive medium releasing therein the energy initially stored in the annular chamber.

7. The method of claim 6 wherein the electrically conductive medium is selected from the group consisting of a gas, an ionized gas and plasma.

8. The method of claim 6 wherein the layer adapted to having superconductive properties is a binary alloy of niobium and tin.

9. An apparatus for transferring energy to an electrically conductive medium which comprises a first cylinder defining a first chamber containing the conductive medium, a second annular cylinder defining a second annular chamber surrounding said first chamber, at least part of the inner wall covering of said second chamber being made of a superconductive material and forming a superconductive circuit closed on itself, means for producing a current in the closed superconductive circuit and means for causing said circuit to undergo transition from the superconductive state to the normal state.

10. The apparatus of claim 9 wherein the first cylinder is made of electrically insulating material.

11. The apparatus of claim 9 wherein the superconductive material is a layer of a superconductive binary alloy.

12. The apparatus of claim 11 wherein the binary alloy is an alloy of niobium and tin having the formula Nb3Sn.

13. The apparatus of claim 9 wherein the covering of the inner wall of the second chamber is formed by superconductive turns or strips.

14. The apparatus of claim 9 wherein the means for producing a current in the superconductive circuit are coils in the vicinity of said circuit and provided with time-shifted multiphase, alternating currents.

15. The apparatus of claim 14 wherein said coils are disposed at the outside of the second annular cylinder.

16. The apparatus of claim 10 wherein the means for causing the transition of the superconductive circuit from the superconductive state to the normal state is a resistant electrical conductor disposed in the wall of the first cylinder.

17. The apparatus of claim 9 wherein the means for causing the transition of the superconductive circuit from the superconductive state to the normal state is a solenoid, the windings of which are disposed near the outside wall of the first cylinder.

18. The apparatus of claim 9 wherein the second annular cylinder is provided with windows for filling it with a bath of liquified gas at a very low temperature.

19. An apparatus for transferring energy to an electrically conductive medium which comprises a substantially closed electrically conductive first cylinder, a second cylinder made of an insulating material which is coaxial with and disposed within said first cylinder, said second cylinder defining an inner chamber containing the electrically conductive medium and also defining with the walls of the first cylinder an annular chamber, the inner walls of said annular chamber being at least partially covered with a layer of material having superconductive properties under appropriate temperature and magnetic field conditions, said layer forming a superconductive circuit, a resistant circuit disposed in the walls of the second cylinder for raising its temperature, a means disposed in the annular chamber for producing a magnetic field on the superconductive layer and electric coil means disposed at the outside of the first cylinder to produce a sliding field, said coils being provided with time-shifted, multiphase alternating currents.

20. The apparatus of claim 19 wherein duct means communicate with the inner chamber for introducing the electrically conductive medium to said chamber.

21. The apparatus of claim 19 wherein the superconducting circuit is made of a niobium-tin binary alloy.

22. The apparatus of claim 19 wherein a solenoid is provided for producing a magnetic field on the superconductive layer.

23. The apparatus of claim 22 wherein the resistant circuit and the solenoid are connected to a conventional source of electric current.

24. The apparatus of claim 19 wherein the inside walls of the inner chamber are at least partially lined by a solidified gas, the partial vaporization of which forms the electrically conductive medium.

25. The apparatus of claim 24 wherein the solidified gas is deuterium.

26. The apparatus of claim 19 wherein the inner chamber is provided with a laser rod surrounded by a tubular casing containing a gas, said chamber being provided with an aperture having a diameter the same as that of the laser beam for the passage of said laser beam emitted by the pumping of the laser rod.

27. The apparatus of claim 19 wherein the inner chamber is provided with end plates which extend into the inner chamber in the form of cylindrical electrodes, thereby reducing the volume of the inner chamber.

28. The apparatus of claim 19 wherein the chamber containing the electrically conductive medium is provided above a storage chamber, and separated from said storage chamber by a plate containing a heating means, the inner walls of the storage chamber being at least partially covered with a layer of material forming a superconductive circuit.

29. The apparatus of claim 28 wherein the superconductive circuit is a set of wire turns or strips closed on itself.

30. The apparatus of claim 29 wherein the wire turns are disposed in series with each other and form a continuous winding.

31. An apparatus for transferring energy to an electrical conductive medium which comprises a substantially closed electrically conductive second storage chamber, said storage chamber having a central tubular element disposed so that the current lines flow in planes passing through the axis of said second chamber, the inner walls of said storage chamber being at least partially covered with a layer of material having superconductive properties under appropriate temperature and magnetic field conditions, said layer forming a superconductive circuit, a first chamber containing an electrically conductive medium disposed adjacent said second chamber and coaxial with respect thereto, a plate means separating the first chamber from the second chamber and disposed substantially perpendicular to the axis of said chambers, a resistant circuit disposed in the walls of the plate means for raising the temperature, a means disposed in the second chamber for producing a magnetic field on the superconductive layer and electrical coil means disposed at the outside of the second chamber to produce a sliding field, said coils being provided with time-shifted, multiphase alternating currents.

32. A method for transferring energy to an electrically conductive medium in a first chamber from a second chamber, said second chamber having walls at least partially internally covered with a layer adapted to have superconductive properties, which comprises producing a state of superconductivity in the layer by bringing it to a very low temperature, producing a current density in the superconducting layer by means of a drifting field produced by coils provided with a time-shifted, multiphased alternating current, trapping the current in the second chamber, said trapped current across the superconductive layer producing a magnetic field of revolution in the second chamber which corresponds to a given energy, transferring this energy into the electrically conductive medium in the first chamber by raising the temperature of the layer thereby causing the transition of said layer from the superconductive to the normal state which creates a potential difference which in turn produces an electric arc causing passage of the trapped current into the electrically conductive medium releasing therein the energy initially stored in the second chamber.